Jan. 31, 1967     O. H. VARGA     3,301,524
SEALING MEANS FOR VALVES
Filed Feb. 17, 1966     2 Sheets-Sheet 1
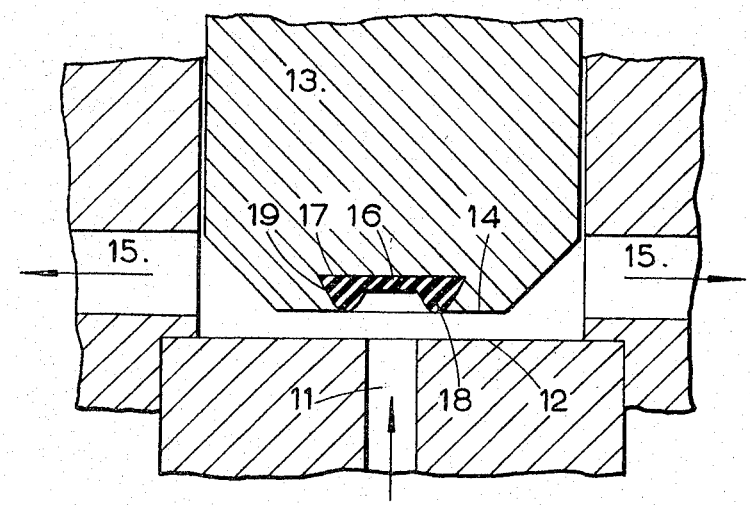
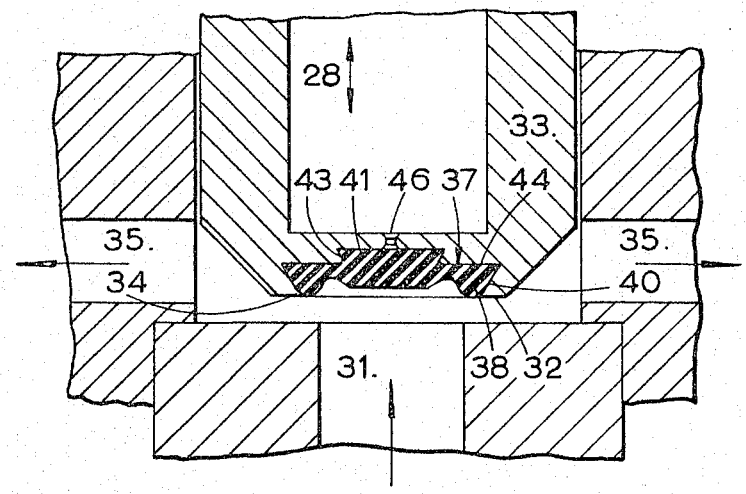
INVENTOR
BY *OTTO HERMAN VARGA*
*Shoemaker and Mattare*
ATTORNEYS

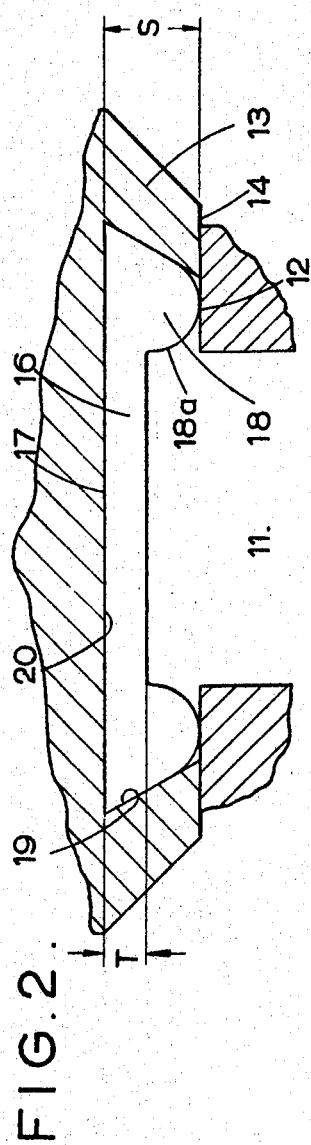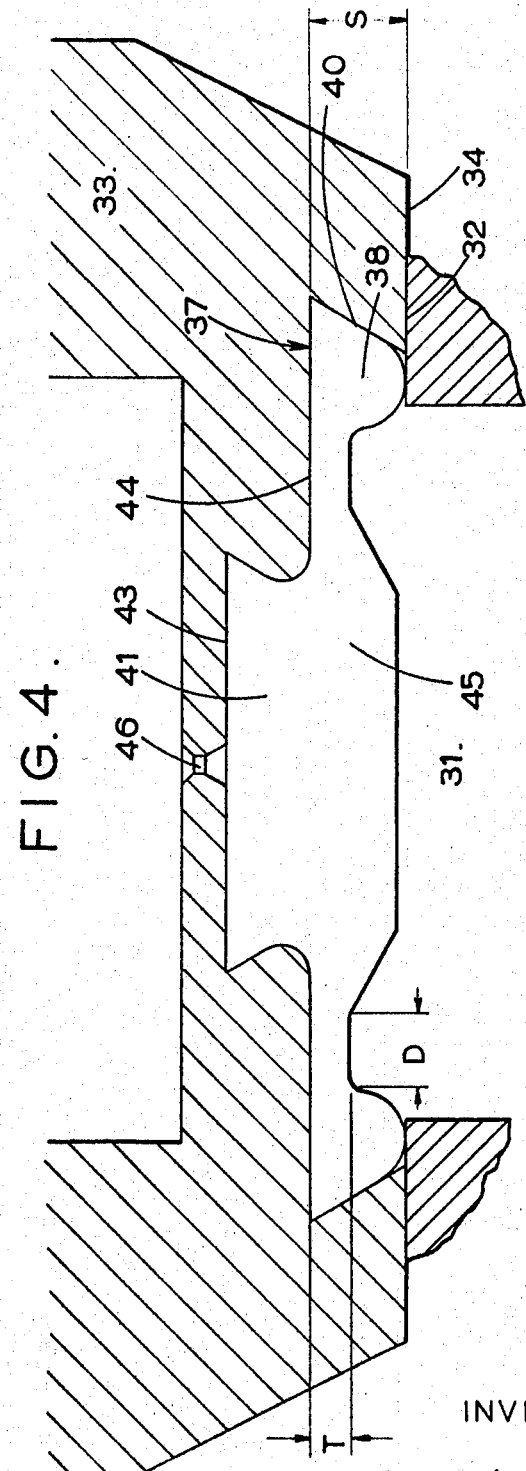

United States Patent Office 3,301,524
Patented Jan. 31, 1967

3,301,524
SEALING MEANS FOR VALVES
Otto Herman Varga, Bradford-on-Avon, England, assignor to Seetru Limited, Bristol, England, a British company
Filed Feb. 17, 1966, Ser. No. 528,296
Claims priority, application Great Britain, May 11, 1962, 18,140/62
6 Claims. (Cl. 251—175)

The purpose of this invention is to provide an improved form of seal for valves particularly relief valves and float operated valves of the kind where a valve closure member, usualy a cylindrical plunger, abuts with the valve seat on closure and the valve seat has a central aperture or port through which the pressure fluid enters the valve chamber.

It is known in such a valve to provide the valve closure member with a cavity in which is housed a resilient sealing element having an annular rim which is arranged to surround the aperture or port when the valve closure member abuts with the seat to effect sealing therebetween, the sealing element being so shaped that it presents to the port a continuous unbroken surface bounded peripherally by the rim.

The invention has for its object to provide improvements in valves of the type above defined and accordingly the invention provides a valve comprising a seat member surrounding a port, a valve closure member positioned downstream of the port and having a face adapted to be brought into abutment with the seat when the port is to be closed, a recess in the said face of the valve closure member opposite to the port, a diaphragm shaped resilient sealing element disposed in said recess, said sealing element having an integral continuous beaded rim on the front face theerof so that the sealing member presents to the port an uninterrupted continuous surface bounded by said bead, said beaded rim being D-shaped in cross section with the flat side integral with the diaphragm, the depth of the beaded rim measured from the crown to the flat base being substantially equal to the mean width of the bead measured parallel to the base, the thickness of the central portion of the diaphragm over a region where it adjoins the bead being not greater than 45% of the depth of the bead and said thickness being maintained over said region for a distance, measured radially inwardly of the beaded rim of not less than 80% of the depth of the bead and the crown of the rim having a diameter in excess of that of the port. By this construction the sealing bead, which preferably has its crown either level with the face of the valve closure member or protrudes therefrom by a small distance which does not exceed 5% of its depth, is free to accommodate itself to the fully sealed position under both high and low pressure without being impeded by internal strains induced from the central diaphragm portion and without risk of its being nipped between the closure member and the seat.

The crown of the beaded rim is arcuate when viewed in the transverse cross section and although as stated above the crown will have a diameter in excess of that of the port which is to be obturated, the diameter of the crown measured at its tip will preferably not exceed the diameter of the port by more than 30%. In order to relate the size of the beaded rim to that of the port it can be stated that the depth of the rim measured from the crown to the base, will not exceed 40% of the diameter of the port which is obturated in most cases.

In the closed position of the valve when the closure member is in metal-to-metal abutment with the seat the crown of the rim makes contact with the seat preferably over an annular area whose inside diameter is greater than that of the port in the valve seat, so as to leave an annular area of said seat immediately surrounding said port with which the sealing member never makes contact. In this way the sealing member cannot be damaged by contact with the mouth of the port which may be sharp-edged.

The invention will be described with reference to the accompanying drawings in which five embodiments of valve sealing arrangements are illustrated in cross section.

FIGURE 1 shows a first embodiment with the valve members in the valve open position.

FIGURE 2 is a detail view to larger scale of the same embodiment with the valve closed.

FIGURE 3 illustrates a second embodiment where the bore to be sealed is larger than that of the embodiment of FIGURES 1 and 2.

FIGURE 4 is a detail view to larger scale of the embodiment of FIGURE 3, but with the valve members shown in the closed position.

Referring first to FIGURES 1 and 2, the sealing device here shown is intended to close small valve holes or ports 11, of the order of 0.25" diameter or less.

In FIGURE 1 a seat 12 surrounding the mouth of the port 11 is substantially flat as is a corresponding annular nose portion 14 of a valve closure member 13. The closure member 13 is arranged to be movable in the direction of the arrow 8 to bring its nose portion 14 into abutment with the seat 12 to obturate the port 11 and close the valve.

Formed centrally of the nose portion 14 is a recess 17 in which is located a resilient sealing member according to the invention. Such member comprises an imperforate membrane 16 of rubber or the like having an integral beaded rim 18 which is D-shaped in cross section, the base of the D and the central membrane portion 16 lying against the flat base of the recess 17. The side walls 19 of the recess 17 are undercut to conform with the shaping of the outer periphery of the rim 18.

Preferably when the valve closure member 13 is in the position shown in FIGURE 1 the crown of the rim 18 stands level with or just proud from the flat nose portion 14.

When the member 13 is lowered to bring its nose portion 14 into metal to metal abutment with the seat 12 the beaded rim 18 effects sealing between the nose 14 and the seat 12, while the imperforate central membrane portion 16 of the sealing member prevents fluid from entering under the rim to cause this to be dislodged by fluid pressure, particularly when the valve plunger 13 is on the point of lifting from the valve seat 12 as the valve is opened.

Instead of the seat 12 being formed flat as shown in FIGURE 1, it may be formed conically or spherically in which case the nose portion 14 of the plunger 13 will be shaped to conform therewith. For example if the seat is convex the nose portion will be concave.

Referring now more particularly to FIGURE 2, the lip 18 of the sealing member, when viewed in transverse cross-section, is of general D-shape with the bar of the D forming a prolongation of the central membrane portion 16 of the sealing member, so that the sealing member has a flat base 20 lying against the flat base of the recess 17. The rim 18 has a depth S measured from the crown to the base which is substantially equal to the mean width of the rim measured parallel to the base 20. Due to these dimensions the rim 18 acts substantially as an O-ring, which is well-known for its hydrostatic sealing ability. The action of the resilient sealing member, may best be understood if the member is considered to function like a fluid-filled bag; for when fluid pressure acting through the port 11 is brought to bear on the inner face of the rim, indicated at 18a, the pressure sets up stresses which are uniformly distributed throughout the rim 18. This causes the rim to be resiliently deformed into contact with the seat 12 and with the side walls 19 of the recess 17 and in particular to seal in the region where the nose 14 abuts with the seat 12. A similar action takes place in the central membrane portion 16, which is pressed into sealing engagement with the base of the recess 17.

However, the correct functioning of the sealing member is mainly dependent upon the behaviour of the rim 18, this being particularly apparent at low fluid pressure, and it is important that the behaviour of the rim should not be impeded by internal strains induced from the central membrane portion 16. Hence it is an essential feature of the invention that the membrane portion 16 is of a thickness T which does not exceed 45% of the depth S of the rim in the region where the membrane adjoins the rim 18. In the embodiment illustrated in FIGURES 1 and 2 the thickness of the membrane portion 16 is constant over its whole area. It has been found that if the thickness of the central membrane portion 16 in the region where it adjoins the rim substantially exceeds 45%, the functioning of the rim suffers, particularly at low fluid pressures.

The crown of the rim 18 is either level with the nose portion 14, in the valve open position of FIGURE 1, or its stands proud by an amount which does not exceed 5% S. By this feature it is ensured that the rim is not pinched between the nose 14 and the seat 12. The crown of the rim 18 presses in efficient wedge sealing manner into the such that the crown makes contact with the seat 12 and leaves an annular area of the seat immediately adjacent the mouth of the port 11 with which the sealing member never makes contact. It is ensured by this measure that the rim cannot be damaged by the edge of the port which may be sharp.

The side walls 19 are undercut to form an acute angle of 60° with the base of the recess 17 and the outer periphery of the rim 18 is correspondingly shaped. By this measure, when fluid pressure obtains, the material of the rim 18 passes in efficient wedge sealing manner into the corners of recess. As well as sealing, this measure also contributes to the retention of the sealing member in the recess 17. Such retention is also a function of the central membrane portion 16 which prevents fluid from entering beneath the rim 18.

In two specific embodiments of the seal illustrated in FIGURES 1 and 2 the relative dimensions of the sealing components are as follows:

|  | Type A | Type B |
| --- | --- | --- |
| Nominal bore | Up to 0.125 in. | 0.125–0.25 in. |
| S | 0.040 in. | 0.070 in. |
| T | 30/40% S | 30/40% S. |
| Diameter of crown measured at tip | 0.15 in. | 0.325 in. |

FIGURES 3 and 4 illustrate alternative sealing means according to the invention adapted to obturate inlet ports 31 which are of larger diameter than the inlet ports previously described. The ports 31 may be up to one inch in diameter. 35 are outlet ports.

In FIGURE 3, 32 is a flat annular seat surrounding the mouth of the port 31, and 33 is a valve closure member movable in the direction of the arrows 28 and having an annular nose portion 34 adapted to be brought into proximity with the seat 32 when an inlet port 31 is to be obturated. Carried within a recess 37 in the nose 34 of the plunger, is a resilient sealing element according to this embodiment of the invention. This comprises an imperforate diaphragm having an annular beaded rim 38 which is generally D-shaped in cross-section. The bar of the D rests against the flat annular base portion 44 of the recess 37, the remainder of the diaphragm being continuous across its central zone within the rim 38.

The interior of the closure member 33 is hollow and a cavity 43 with undercut side walls is formed in the base of the recess 37.

A dovetail portion 41 of the resilient sealing member, is engaged behind the undercut walls of the cavity 43.

The side walls 40 of the recess 37 are undercut to form an acute angle of 60° with the base portion 44 of the recess 37 and the outer periphery of the D-section rim 38 is shaped in conformity. The resilient sealing member is a tight fit in the shaped recesses 37 and the cavity 43, and to make its insertion easier a very small passage 46 may be provided to enable air to escape from under the sealing member as the latter is inserted. Such passage will be sufficiently small to ensure that the resilient material of the sealing member is not forced into it under very high pressure.

In all respects the rim 38 functions in the same way as the rim 18 previously described with reference to FIGURES 1 and 2, and in this embodiment also it is essential that the behaviour of the rim should be unimpeded by the internal strains induced from the central diaphragm portion. Accordingly, as is shown in FIGURE 4, the central diaphragm portion, in the region where it adjoins the rim 38, has a thickness T which does not exceed 45% of the depth S of the rim measured from the crown to the base. Moreover, this thickness T is maintained over a distance D extending radially inwards from the rim 38 which is equal to or greater than 80% of the depth S of the rim.

The central region of the diaphragm may be optionally thickened as at 45 with the object of precluding the possibility of the diaphragm being damaged or even punctured in use. However, such thickening will not be extended radially outwards to such a degree that the distance D is less than 80% S.

Again in the embodiment of FIGURES 3 and 4, the crown of the rim 18 will be either level with the nose 34 or it will stand proud therefrom by a distance which does not exceed 5% S.

In both embodiments the sealing member provides a leak-proof sheet immediately the sealing rim 18 or 38 is brought into contact with the seat 12 or 32, and this generally happens a few hundredths of a millimeter before the valve plunger abuts on the seat because of the tendency of the resilient material to flow when the full force of fluid pressure bears on it. Indeed, as soon as pressure obtains, the entire sealing rim is extended outwards into firm engagement with the walls of the recess 17 or 37, and with the crown of the ring being resiliently deformed so that it flows into engagement with the seat. The radial outward movement of the rim is substantially freely permitted by the central portion of the sealing member owing to the thinness of the central portion in the region where it adjoins the rim so that there results a sensitive and reliable seal both at high and at low fluid pressure. The sealing member according to the invention is of particular advantage in safety valves of the kind in which closure member is urged by resilient spring means towards the seat in opposition to the pressure fluid. In such valves when the pressure of the fluid reaches a predetermined level, the closure member is lifted from the seat and immediately before this level is reached the opposing forces of the spring and the fluid pressure are substantially equal and hence there is little or no mechanical force effectively pressing the closure member against the seat. Yet in this condition, it is important that the sealing element should continue to seal so that fluid flow should only commence a the precise value of hydrostatic pressure for which the valve is set. It will be appreciated that as the sealing effect of the invention is dependent upon the degree of fluid pressure acting on the rim, as distinct from the fact of whether or not the rim is pressed by the valve closure member against the seat, the sealing member is admirably suited to provide the delicate functioning required in safety valves. It will also be appreciated that if the rim is subjected to internal strains derived from an overthick central membrane portion its sensitivity will suffer.

Also in both embodiments above described, the outer periphery of the rim is pressed in wedge fashion into the acute angle formed between the undercut side walls and the base of the recess in which the seal is housed. This feature obtains the dual advantages of sealing with the recess and secure retention of the seal with the recess.

Finally, the size and contour of the beaded rim is specifically designed so that it is safeguarded against damage, on the one hand from being trapped between the closure member and the seat and on the other hand from damage which might arise from contact with the edge of the mouth of the port being obturated.

I claim:
1. A valve comprising in combination:
    (a) a member having a port and a seating surface surrounding the same,
    (b) a movable valve closure member positioned downstream of said port and having a face adapted to be brought into abutment with said seating surface in the closing of said port,
    (c) said valve closure member face having therein an annular recess concentric with said port,
    (d) said recess having a bottom surface and an undercut sloping side wall joining said bottom surface in an acute angle,
    (e) a resilient sealing disc element in said recess having a face directed toward said port and having an outwardly sloping surrounding side wall conforming in slope or inclination to said undercut sloping side wall of said recess and having a flat base bearing against the said recess bottom surface,
    (f) said disc element having a continuous annular bordering sealing rim bead of substantially D-configuration in cross section upon said face presenting the crown of a substantially semicircular surface to said port surrounding seating surface for seating contact with the latter,
    (g) said sloping side wall of said sealing disc joining tangentially with the said substantially semi-circular surface of the bead at the outer side of the latter,
    (h) said beaded rim portion of the sealing disc having a depth from said crown to said flat base substantially equal to the mean width of the bead measured parallel to the base, the portion of the diaphragm adjoining the inner side of the bead having a thickness of from approximately 45% of said depth of the bead to slightly less than such depth,
    (i) the annulus defined by the crown of the bead having a diameter greater than that of said port and less than the smallest diameter of the said recess in the said surface of the valve closure member,
    (j) said crown being disposed relative to the plane of said surface of the valve closure member in such manner as to be compressed against said seating surface in the closed position of the closure member, and
    (k) the outer side of the bead having an area between said crown thereof and the terminal lower portion of the sloping wall of the recess which area is out of contact with said wall of the recess whereby pinching of the resilient sealing disc element between the closure member and the seating surface during closing of the valve is precluded.

2. A valve as claimed in claim 1, wherein the outer peripheral edge of the beaded rim coincides with the outer peripheral edge of the sealing member, said last named edge being V-shaped in transverse cross-section with the apex of the V projecting outwardly and engaging in a V-shaped undercut portion in the side wall of said recess, whereby fluid pressure on the inner side of the beaded rim influences the latter to press in wedge like manner into said V-shaped undercut portion to maintain a seal therewith and to retain said outer edge of the sealing member in said recess.

3. A valve according to claim 1 wherein the said crown of said semi-circular beaded rim stands proud therefrom by a distance which does not exceed 5% of the depth of the rim measured from its crown to its base.

4. A valve according to claim 1 wherein the sealing element has a projection on the rear face thereof, said projecting having an overhanging peripheral rim and said closure member having a cavity in the base of its recess receiving said projection in interlocking dovetail relation.

5. A valve according to claim 1 wherein in the closed position of the valve when the closure member is in metal-to-metal abutment with the seat, the crown of the beaded rim makes contact with the seat over an annular area of said seat whose inside diameter is greater than that of the port in the valve seat, so as to leave an annular area of said seat immediately surrounding said port with which the sealing member never makes contact.

6. The invention according to claim 1, wherein the said thickness stated in sub-paragraph (h) is maintained over the said portion of the diaphragm for a distance measured radially inwardly of the beaded rim of not less than 80% of the depth of the bead.

References Cited by the Examiner
UNITED STATES PATENTS

| 2,254,209 | 9/1941 | Buttner et al. | |
| 2,593,740 | 4/1952 | Faust | 251—357 |
| 2,610,021 | 9/1952 | Smith | 251—332 |
| 2,678,187 | 5/1954 | Peters. | |
| 2,936,154 | 5/1960 | Von Platen et al. | 251—332 |

M. CARY NELSON, *Primary Examiner.*

HENRY T. KLINKSIEK, *Examiner.*